M. Mattson,
Breast Pump.

№ 82,015.            Patented Sep. 8, 1868

Witnesses
                                                       Inventor
                                                     Morris Mattson

United States Patent Office.

MORRIS MATTSON, OF NEW YORK, N. Y.

Letters Patent No. 82,015, dated September 8, 1868.

IMPROVED BREAST-PUMP.

The Schedule referred to in these Letters Patent and making part of the same.

TO ALL WHOM IT MAY CONCERN:

Be it known that I, MORRIS MATTSON, M. D., of the city of New York, in the county of New York, and State of New York, have invented a new and useful Improvement in Breast-Pumps; and I do hereby declare that the following is a full, clear, and exact description thereof, and of its mode or manner of operation, reference being had to the accompanying drawings, and to the letters of reference marked thereon, and making a part of this specification.

Breast-pumps are usually regarded by physicians, nurses, and lying-in women, as very imperfect instruments. This is owing to the fact that they frequently occasion pain or suffering when they are used, or because they fail to draw milk in a satisfactory manner from the breast. These results are chiefly due to the improper construction of the instrument, and particularly of the vacuum-glass.

Figure 1:
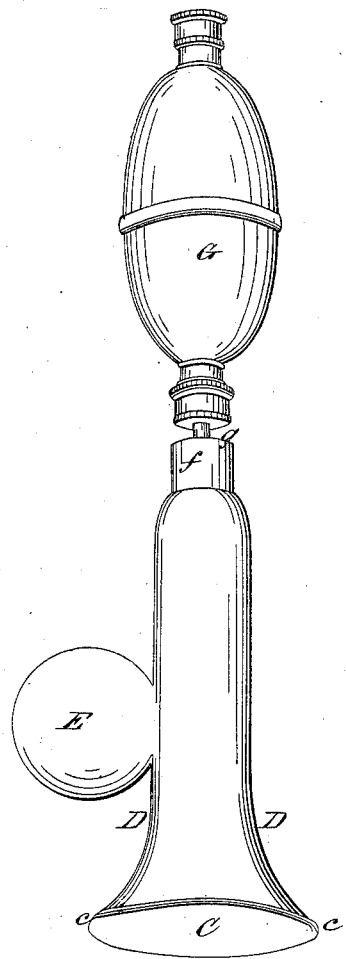
Figure 1 is a general perspective view or representation of my improved breast-pump complete.
Figure 2:
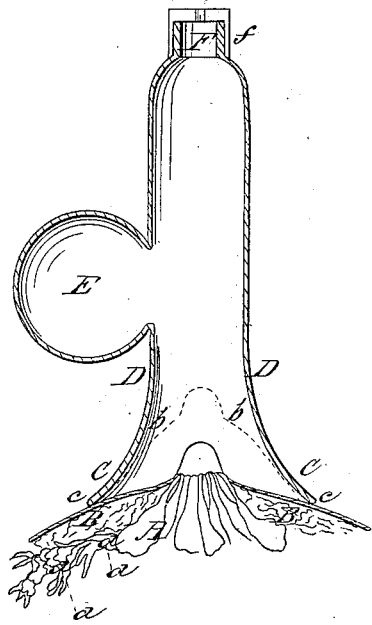
Figure 2 is a sectional view of the vacuum-glass in position on the breast, and the latter shown in its natural condition, and when the glass has been exhausted.

By a series of experiments, I have been enabled to construct a breast-pump whereby these defects are almost entirely obviated. In such experiments I constantly kept in view the peculiar arrangement of the milk-ducts of the breast, of which there are ten to fifteen, having their orifices at the top of the nipple. The section of the human breast, shown in fig. 2, is taken, with some variations, from Sir Astley Cooper's work, "On the Anatomy of the Breast," and shows the arrangement and position of such milk-ducts. As these ducts pass downward below the base of the nipple into the substance of the breast, they become greatly enlarged, as shown at A, and form capacious reservoirs for the collection of the milk when it is allowed to accumulate. Such ducts also radiate toward the circumference of the breast, as seen in the same figure, and the large ducts also give off branches or subdivisions, as shown at $a\ a$. Between the larger milk-ducts and the external skin or integument intervenes a cellular or connective tissue, shown at B B.

In my first experiments with the breast-pump, I employed a vacuum-glass of the ordinary size, having a diameter, at the terminal extremity which encloses the nipple, of about an inch. I found that this form of glass was liable to produce pain and suffering, which were sometimes severe, and there was frequently a failure to draw milk, notwithstanding a very complete exhaustion of the air within the glass. These difficulties were evidently due to the pressure of the vacuum-glass upon the milk-ducts adjacent to the nipple, as will be readily understood by reference to fig. 2. These ducts being pressed upon and constricted, the milk could not flow through them readily, or perhaps not at all, and the pressure of the milk within the ducts, seeking to force its way out into the vacuum-glass, would necessarily occasion more or less pain or suffering.

The vacuum-glass which I ultimately found to be the best adapted to the purpose is formed with a trumpet-mouth, C, as seen in the figures, the outside diameter of which, including the flange $c$, is about two and a half or three inches, or large enough so as to rest upon the cellular tissue B, and not press upon the milk-ducts, where they collect and enter the nipple. The diameter of the cylindrical portion D D of the vacuum-glass, where it begins to enlarge into the trumpet-mouth, should be about one and a quarter inch, and the distance from the mouth C to the cylindrical part should be about one and a half-inch. E is the bulbous projection or reservoir, designed for the reception of the milk after it has issued from the nipple. F is the perforated stem, for receiving a rubber cap, $f$, (patented to me, October 8, 1867,) by which the bulb-exhauster G is coupled with the vacuum-glass, by means of the pipe $g$.

When a vacuum is produced in the glass by the action of the exhaust-bulb G, the nipple and portion of the breast which are drawn into the glass will nearly or quite fill the trumpet-mouth of the glass, as indicated by the dotted line $b\ b$ in fig. 2; but it will be perceived that the large ascending milk-ducts are in no danger of being compressed, because the circumference or mouth of the glass extends beyond the outer limits of said ducts, where they enter the nipple. At the same time the smaller and remoter ducts are equally free from any essential compression, being more deeply seated, and having a considerable amount of cellular tissue intervening between them and the exterior skin or integument with which the glass is in contact. In addition to this, the expanded surface of the glass at its terminal extremity, and which makes a flanged edge, c c, prevents the glass burying itself deeply in the substance of the breast when a vacuum is produced, which it would be more likely to do if its sides were nearly cylindrical, or if the edge of the glass at its circumference were thin, and which would increase the liability of the milk-ducts to compression.

From these explanations, it will be apparent, while the vacuum-force within the glass continues in operation, that the smaller milk-ducts, remote from the centre of the breast, will naturally pour their contents into the larger ones, seeking the outlets at the nipple which nature has provided, and which receives no compression. The flow of milk under these conditions is ordinarily free and comparatively painless, because the milk-ducts are not subjected to any essential compression.

The mouth of the vacuum-glass, as before mentioned, should be trumpet-shaped; and I prefer that the outside diameter should not be more than three nor less than two inches. Within about these measures the glass will be adapted to the smallest breast that is likely to be met with, while it will be equally suited to breasts of larger size. Had the glass a larger diameter than three inches, there would be an occasional breast so small that the glass could not be successfully used; but with a diameter of not less than two and a half inches, there is no great danger of any essential compression of the large central milk-ducts. Thus no lying-in woman need fear that the glass may not be adapted to her particular case.

The interior of the glass at D D does not require a greater diameter than about an inch, as this will furnish all the vacuum-space requisite for the reception of the nipple, and anything beyond this would only tend to make the glass clumsy and heavy.

The aggregate length of the glass from C to F may be from five to six inches. A shorter glass might answer, but I prefer about the length specified, as sometimes the jets of milk are quite forcible, and might be projected into the valve-chamber of the exhausts. This, however, would not be a serious matter, as the milk could be readily washed away from the valve, which could most conveniently be effected by passing a current of water in the exhauster, in the same way water is passed through an elastic bulb-syringe.

The exhauster to be used in connection with the vacuum-glass described, involves important considerations. The ordinary piston-pump has its objections, though it may be used, inasmuch as the downward force of the piston, which is communicated to the vacuum-glass, must tend in many cases to produce uncomfortable pressure upon the breast.

An elastic bulb, which I prefer, is free from that objection, since, being compressed laterally, there is no force of any consequence applied directly to the breast, excepting what is necessary to keep the vacuum-glass or cup in contact with the breast. A bulb, however, to be efficient, must have a double set of valves, as, if there are no valves, it is not easy to regulate the exhaustion of the air within the vacuum-vessel, and thus the vacuum may be insufficient, or it may be excessive. In the first case the milk may not flow, and in the second case, there may be pain or suffering, and withal no flow of milk. An elastic bulb, having the proper elastic force, and furnished with proper valvular apparatus, will obviate all these difficulties. When the breasts are tumefied and painful, they must be dealt with in the most gentle manner. Inconsiderate exhaustion of the air within the vacuum-vessel might cause the milk to flow too rapidly into the milk-ducts, perhaps already engorged and painful, and thereby give rise to extreme suffering. This is to be avoided by a very slight exhaustion of the air, so that nature may be prompted in the most gentle manner to perform her functions. I prefer a bulb-exhauster such as is described in Letters Patent granted to me, August 13, 1867, and using the elastic floating valves patented to me, April 4, 1854, and extended March 30, 1868.

The bulb-exhauster which I have described, with its delicate elastic floating valves, will perform the exact service required in the most desirable manner. The bulb may be compressed slightly between the fingers, so as to exhaust but very little of the air within the vacuum-glass, or it may be forcibly, fully, and repeatedly compressed, so as to produce the maximum degree of exhaustion. If there be no obstruction of the milk-ducts, nor a thick or creamy condition of the milk, which is sometimes met with at the commencement of lying in, the milk will flow in proportion to the amount of the vacuum produced.

My improved instrument may thus be successfully used according to the variable circumstances and necessities of the case.

This instrument will answer equally well for the development of retracted nipples, where the difficulty is not connected with organic disease. A glass of the size described is better than a smaller one, for the reason that that portion of the breast represented by what is called the areola, should undergo development along with the nipple.

What I claim as my invention in breast-pumps, and desire to secure by Letters Patent, is—

The combination, with a vacuum-glass constructed substantially as described, of an exhausting-mechanism or instrument, having a double valvular apparatus operating substantially as and for the purposes set forth.

MORRIS MATTSON.

Witnesses:
  S. D. LAW,
  FRED. B. SEARS.